Figure 5:
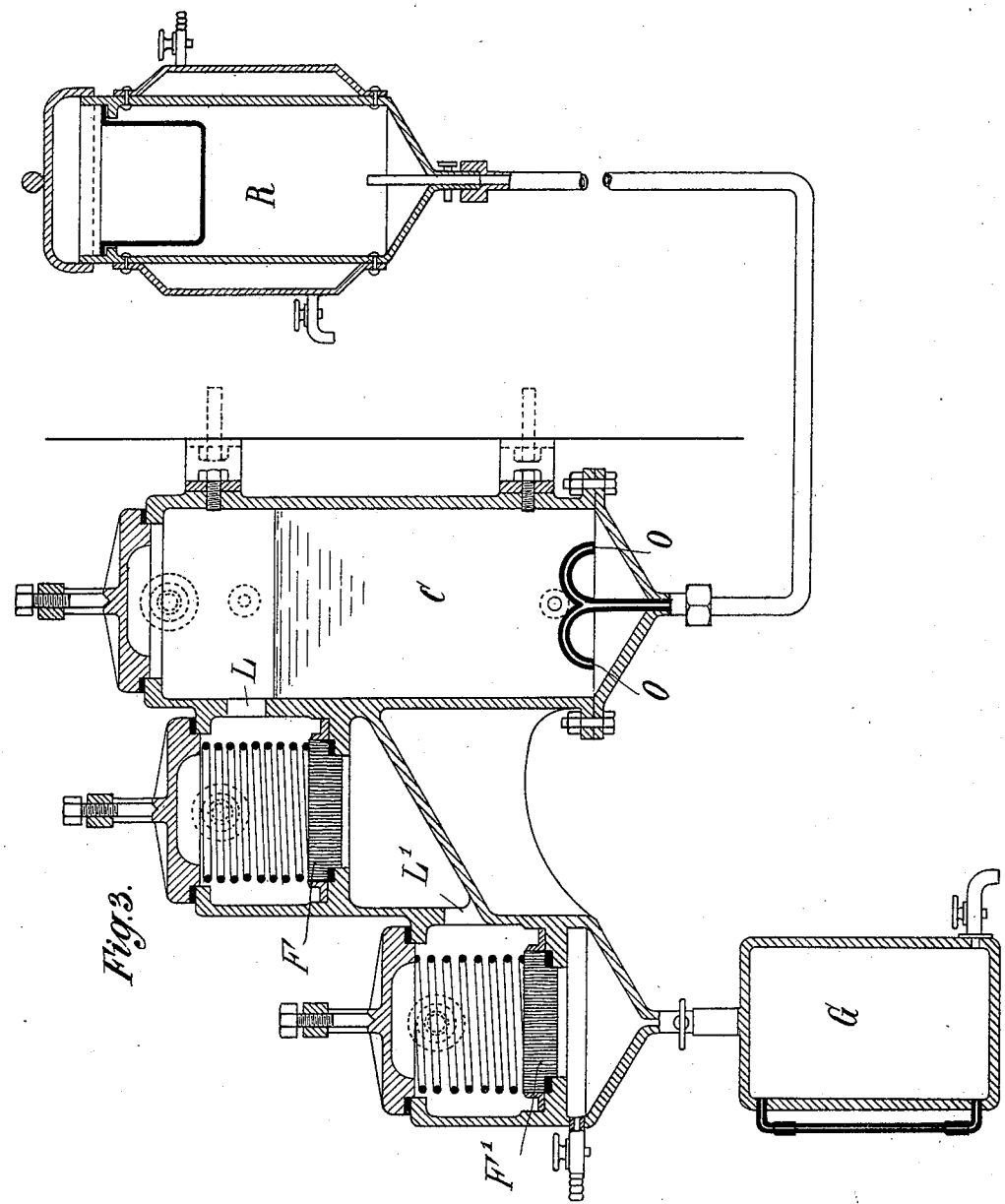

No. 635,745. Patented Oct. 31, 1899.
H. W. H. CLAASSEN.
FILTER.
(Application filed Feb. 2, 1899.)
(No Model.) 3 Sheets—Sheet 1.
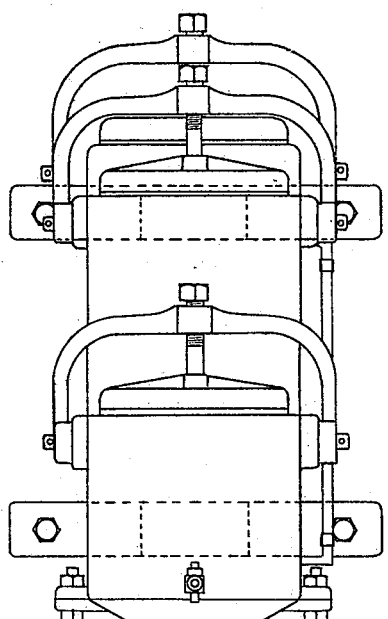
Fig. 5.
Fig. 1.
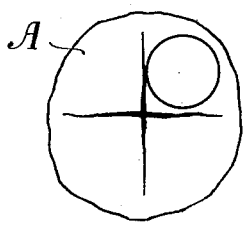
Fig. 2.
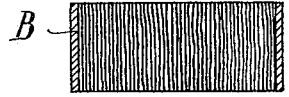
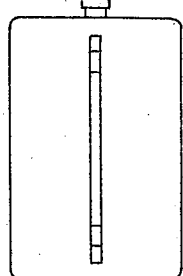
Fig. 4.
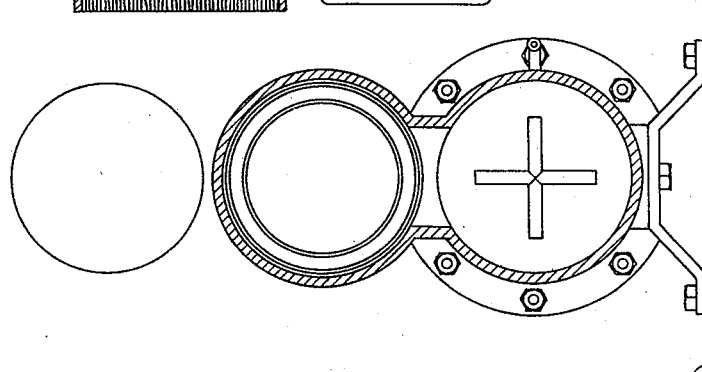
Witnesses
Inventor
Heinrich W. H. Claassen
by Foster & Freeman
Attorneys No. 635,745. Patented Oct. 31, 1899.
H. W. H. CLAASSEN.
FILTER.
(Application filed Feb. 2, 1899.)

(No Model.) 3 Sheets—Sheet 3.

Witnesses
Paul W Stevens
Harry E. Hay

Inventor
Heinrich W. H. Claassen
by Foster Freeman
Attorneys

THE NORRIS PETERS CO., PHOTO-LITHO., WASHINGTON, D. C.

UNITED STATES PATENT OFFICE.

HEINRICH WILHELM HERMAN CLAASSEN, OF BEUTHEN, GERMANY.

FILTER.

SPECIFICATION forming part of Letters Patent No. 635,745, dated October 31, 1899.

Application filed February 2, 1899. Serial No. 704,248. (No model.)

*To all whom it may concern:*

Be it known that I, HEINRICH WILHELM HERMAN CLAASSEN, manager, a subject of the King of Prussia, German Emperor, residing at Beuthen, Upper Silesia, in the Kingdom of Prussia, Germany, have invented a certain new and useful Improvement in Filters, (for which I have applied for a patent in Germany, filed August 26, 1898,) of which the following is a specification.

The filters hitherto known to me have the following disadvantages: The impurities, mixed up with the liquids or gases to be purified, penetrate into the filtering masses and soil them, which necessitates their frequent renewal or cleaning. The extent of this inconvenience can be estimated by the fact that special cleaning processes have been devised in order to utilize the filtering apparatus or filter masses in an economical manner. As the material of the filtering masses, whether these are made of fibrous or granular substance, is always of a more or less loose nature, it is in many cases impossible also to attain the required end—*i. e.*, a satisfactory cleaning of the products in one filtering operation. Attempts are therefore constantly made to replace the filtering mass hitherto used by others more appropriate to fill their purpose.

Trials have already been made for the purpose of turning sea-water into soft potable water by pressing it through tree-trunks. These trials have not, however, led to any useful results, because wooden trunks are not adapted to produce a good filtration when they are simply used in their original condition. According to my present invention I attain this purpose in a perfect manner. Tree-trunks spring up frequently along two diagonals at right angles to each other, which divide them into four parts or quarters. Figure 1 of the accompanying drawings represents the section of such a trunk, and according to the present invention four separate pieces, one for each quarter, as shown by the circle A in one of the quarters, are obtained from the trunk. The filtering bodies obtained in this way possess a uniform texture. These filtering bodies are surrounded by a special envelop on their whole cylindrical periphery, and this envelop must be absolutely tight. For this purpose the filtering body, if necessary, is made tight where it is in contact with the envelop by a suitable plastic substance. A filtering body of this nature, in which the piece of wood cut across the grain, for instance, is surrounded by an iron cylinder B, is shown in Fig. 2 of the drawings. The liquid or gases to be filtered are passed through the filtering bodies thus constructed by means of air-pressure or a vacuum or a suitable combination of both. The escape of the liquid or gases at the periphery of the filtering bodies is entirely prevented. The filtering body possesses a uniformly dense texture which does not alter while it is in use, and consequently retains in a perfect manner the impurities to be separated from the liquids or gases.

The filter can be applied to the purification of all liquids and gases. The purification effected in the filters hitherto known to me requires the use of large quantities of the filtering mass and in many cases repeated filtration; but in the apparatus forming the subject of the present invention filtering is effected in a perfect manner by passing the substance to be filtered only once through it. The impurities are retained in this filter at the surface and form, after it has been in use more or less time or largely used, a loose mud. The cleaning of the filter consists simply in removing this muddy deposit from the said surface.

As examples of the application of the filter, Figs. 3 to 11 of the accompanying drawings show apparatus in which the filtration takes place in the aforesaid manner. Figs. 3, 4, and 5 show a filter for purifying liquids, oil, &c. Figs. 6 to 11 represent a filter for purifying gases.

A preliminary heating of the product to be purified may take place in the receptacle R, Fig. 3, and a washing of the said product may be effected in a receptacle C, connected with R. The product to be filtered passes then through the opening L onto the first filter F and thence through the opening L' onto the second filter F' and from this into some kind of collecting-reservoir G. The filtering bodies F and F', the direction of the fibers of which is indicated by vertical (hatched) lines, are surrounded at their upper part by a metal ring of suitable section, while the lower part fits tightly into a hole bored for the purpose.

In a frame of a rectangular shape, Figs. 6 to 11, longitudinal channels are formed, which may consist, for instance, of iron of suitable section. Close-jointing plates c, of wood cut across the grain of suitable thickness, are placed in these channels and pressed longitudinally so firmly that the joint between each pair of plates is hermetically closed. The frame and the filtering strips of wood cut across the grain (linden-tree, poplar, alder, &c.) which it contains form a closed plate. The liquids or gases to be purified are brought against the filtering bodies so formed in vertical or a nearly vertical direction or at any suitable angle. The purified liquid or gas (it may also be air) passes along the wooden fibers through the wood cut across the grain onto the free surface of the filter, while the dirt remains on the upper surface of the filtering body, from which it is removed from time to time by suitable means.

Figure 6:
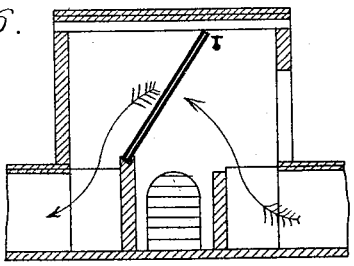
Figure 8:
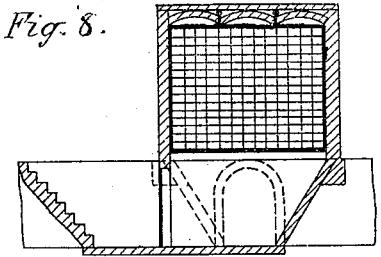
Figure 7:
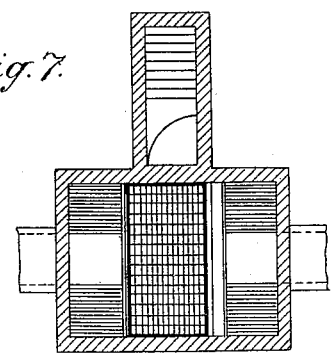
Figure 9:
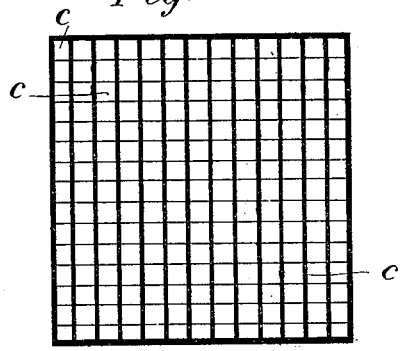
Figure 10:
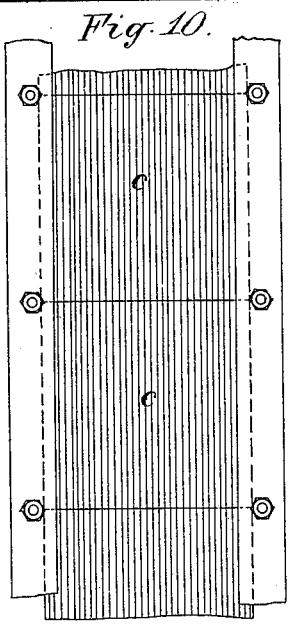
Figure 11:

The applications of this filtering body are manifold. For instance, the gases issuing from roasting-ovens can be freed from the impurities they contain and the hot gases from all kinds of firing installations from soot. By means of the same filtering body the waste water from factories can be purified, so that it may be returned to the river without fear of this being polluted and used again for many other industrial purposes. In the devices used in mills for removing dust from the air, &c., the present filtering body can be utilized to retain the dust drawn from the operating-rooms instead of the ventilator ejecting it into the open air and polluting it. As an example of the application of the filtering body, Figs. 6 to 8 show the arrangement of same for the purification of smoke-gases. The filtering body is disposed obliquely in a suitable structure of masonry over the flue. The gases strike against it, and the soot remains on the side of the filter which looks toward the firing installation. Owing to the inclination of the filter, the soot drops down, while the purified gases escape through the other side into the chimney.

Having thus described my invention, what I claim is—

1. A filtering body for the purification of liquids and gases and their separation from solid substances, consisting of a piece of wood obtained from one of the homogeneous quarters of a tree-trunk, cut across the grain and of substantially uniform texture throughout, and having its lateral surface rendered impervious by a suitable envelop.

2. A filtering body for the purification of liquids and gases and their separation from solid substances, consisting of a piece of wood obtained from one of the homogeneous quarters of a tree-trunk, cut across the grain and of substantially uniform texture throughout, and a metal band surrounding its peripheral surface longitudinally of the grain.

In witness whereof I have hereunto signed my name in the presence of two subscribing witnesses.

HEINRICH WILHELM HERMAN CLAASSEN.

Witnesses:
GUSTAV SCHÖHL,
GUSTAV HÜLSMANN.